(12) United States Patent
de la Fuente

(10) Patent No.: US 10,595,604 B1
(45) Date of Patent: Mar. 24, 2020

(54) FOLIO INCLUDING MAGNETIC HINGE FOR COMPUTING DEVICE

(71) Applicant: Google LLC, Mountain View, CA (US)

(72) Inventor: Valentin de la Fuente, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/420,474

(22) Filed: May 23, 2019

(51) Int. Cl.
| | | |
|---|---|---|
| A45C 11/00 | (2006.01) | |
| G06F 1/16 | (2006.01) | |
| E05D 1/02 | (2006.01) | |
| H01F 7/02 | (2006.01) | |

(52) U.S. Cl.
CPC .............. *A45C 11/00* (2013.01); *E05D 1/02* (2013.01); *G06F 1/1616* (2013.01); *G06F 1/1637* (2013.01); *G06F 1/1681* (2013.01); *A45C 2011/003* (2013.01); *A45C 2200/15* (2013.01); *E05Y 2900/606* (2013.01); *H01F 7/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,588,209 A | * | 5/1986 | Zebrowski ............... | B42D 3/00 24/303 |
| 8,599,542 B1 | * | 12/2013 | Healey .................. | G06F 1/1626 345/168 |
| 8,817,457 B1 | * | 8/2014 | Colby ................... | G06F 1/1669 206/320 |
| 8,988,876 B2 | * | 3/2015 | Corbin ................. | A45C 13/002 361/679.58 |
| 9,489,054 B1 | * | 11/2016 | Sumsion ............... | G06F 3/0208 |
| 9,823,093 B2 | * | 11/2017 | Kauhaniemi .......... | G01D 5/145 |
| 9,851,748 B2 | * | 12/2017 | Senatori ................ | G06F 1/1616 |
| 9,851,749 B2 | * | 12/2017 | Morrison .............. | G06F 1/1616 |
| 9,918,534 B2 | * | 3/2018 | Saila ....................... | A45C 11/00 |
| 10,162,381 B2 | * | 12/2018 | Hsu ........................ | G06F 1/1616 |
| 10,210,975 B1 | * | 2/2019 | Ji ............................ | H01F 7/0273 |
| 2006/0007645 A1 | * | 1/2006 | Chen ..................... | G06F 1/1626 361/679.04 |
| 2013/0170126 A1 | * | 7/2013 | Lee ........................ | G06F 1/1675 361/679.17 |
| 2014/0043741 A1 | * | 2/2014 | Smith ........................ | G06F 1/16 361/679.3 |
| 2015/0295615 A1 | * | 10/2015 | Smith ........................ | A45C 5/02 455/575.8 |

(Continued)

*Primary Examiner* — Lisa Lea-Edmonds
(74) *Attorney, Agent, or Firm* — Brake Hughes Bellermann LLP

(57) ABSTRACT

Example implementations relate to a folio including a covering portion, a flexible hinge portion, and a first magnetic element and a second magnetic element. The first magnetic element and the second magnetic element may be disposed in the flexible hinge portion. The first magnetic element may be configured to move with respect to the second magnetic element. The folio may be configured to move between an open configuration and a closed configuration such that when the folio is in the open configuration, a portion of the first magnetic element is attached to a portion of the second magnetic element, and when the folio is in the closed configuration, the portion of the first magnetic element is separated from the portion of the second magnetic element.

23 Claims, 10 Drawing Sheets

(56) References Cited

U.S. PATENT DOCUMENTS

| | | | |
|---|---|---|---|
| 2017/0060180 A1* | 3/2017 | Griffin, II | G06F 1/1607 |
| 2017/0068281 A1* | 3/2017 | Smith | G06F 1/1669 |
| 2018/0039339 A1* | 2/2018 | Henell | G06F 1/1618 |
| 2018/0168303 A1* | 6/2018 | Marks | A45C 11/00 |
| 2018/0196473 A1* | 7/2018 | Smith | G06F 1/1669 |
| 2019/0212784 A1* | 7/2019 | Oakeson | G06F 3/0231 |

* cited by examiner

FOLIO INCLUDING MAGNETIC HINGE FOR COMPUTING DEVICE

TECHNICAL FIELD

This disclosure relates generally to a folio, and, more particularly, to a folio for supporting a computing device.

BACKGROUND

Folios (e.g., cases, covers, sleeves, skins, etc.) used for portable computing devices may open and close having various modes, for example, a laptop mode and a tablet mode. However, during the laptop mode, the folio may not have desirable support to prevent the computing device from moving (e.g., rotating) past an upright position during use by a user. This can lead to unstable and/or unwanted collapse of the folio, particularly in the laptop mode when the computing device is not on a flat surface. Thus, a need exists for systems and apparatus to address the shortfalls of present technology and to provide other new and innovative features.

SUMMARY

In a general aspect, a folio may include a covering portion, a flexible hinge portion, and a first magnetic element and a second magnetic element. The first magnetic element and the second magnetic element may be disposed in the flexible hinge portion and the first magnetic element may be configured to move with respect to the second magnetic element. The folio may be configured to move between an open configuration and a closed configuration such that when the folio is in the open configuration, a portion of the first magnetic element is attached to a portion of the second magnetic element, and when the folio is in the closed configuration, the portion of the first magnetic element is separated from the portion of the second magnetic element.

In another general aspect, a folio may include a base portion, a covering portion, a flexible hinge portion rotatably coupled to at least one of the base portion or the covering portion, and a first magnetic element and a second magnetic element. The first magnetic element may be configured to move with respect to the second magnetic element between an engaged configuration and a disengaged configuration based on the folio being in an open configuration or a closed configuration. When the folio is in the open configuration, a portion of the first magnetic element is engaged to a portion of the second magnetic element, and when the folio is in the closed configuration, the portion of the first magnetic element is disengaged from the portion of the second magnetic element in the second position.

In another general aspect, a system may include a computing device including a display, and a folio for the computing device. The folio may include: a base portion, a covering portion, a flexible hinge portion rotatably coupled to at least one of the base portion or the covering portion, and a first magnetic element and a second magnetic element, the first magnetic element and the second magnetic element being disposed in the flexible hinge portion. The first magnetic element may be configured to move with respect to the second magnetic element. The folio may be configured to move between an open configuration and a closed configuration such that when the folio is in the open configuration, a portion of the first magnetic element is attached to a portion of the second magnetic element, and when the folio is in the closed configuration, the portion of the first magnetic element is separated from the portion of the second magnetic element.

BRIEF DESCRIPTION OF THE DRAWINGS

The details of one or more implementations are set forth in the accompanying drawings and the description below. Other features will be apparent from the description and drawings, and from the claims.

DETAILED DESCRIPTION

In the implementations described herein, a folio (e.g., keyboard folio) (also can be referred to as an adjustable protective stand assembly) may include a base portion and a covering portion rotatably coupled via a flexible hinge portion. The folio may be configured to be in an open configuration and a closed configuration with respect to a computing device. In some implementations, the computing device described herein may be a tablet type computing device. In some implementations, the flexible hinge portion of the base portion may include a first magnetic element and a second magnetic element such that when the folio is in the open configuration, a portion of the first magnetic element is attached (e.g., engaged) to a portion of the second magnetic element. Conversely, when the folio is in the closed configuration, the same portion of the first magnetic element is separated (e.g., disengaged, detached, apart, disconnected, etc.) to the same portion of the second magnetic element. In other words, a space (e.g., gap, opening, distance, etc.) is between the portion of the first magnetic element and the portion of the second magnetic element when in the closed position. Moreover, having magnetic elements (e.g., first and second magnetic elements) in the flexible hinge portion avoids having additional elements, such as, for example, large metal hinges, tabs, etc. The folio can include an extra layer of fabric in the flexible hinge portion. As a result, this provides an efficient and smooth design of the computing device. In addition, the overall thickness of the computing device is not (or may not be) impacted because the magnetic elements are disposed in the flexible hinge portion, rather than other portions (e.g., covering portion and/or electronic device) of the computing device.

Further, the devices described herein can have advantages over, for example, conventional folios for a computing device where the folio cannot support the computing device in desirable a laptop mode without collapsing or flexing. In other words, the folio described herein can support the computing device and can have stability during the laptop mode. For example, the folio described herein can support the computing device from moving (e.g., rotating) past an upright position (e.g., approximately 110°). In addition, the folio described herein can also easily be converted into a tablet mode by being rotatably moved around via the flexible hinge portion.

Figure 1A:
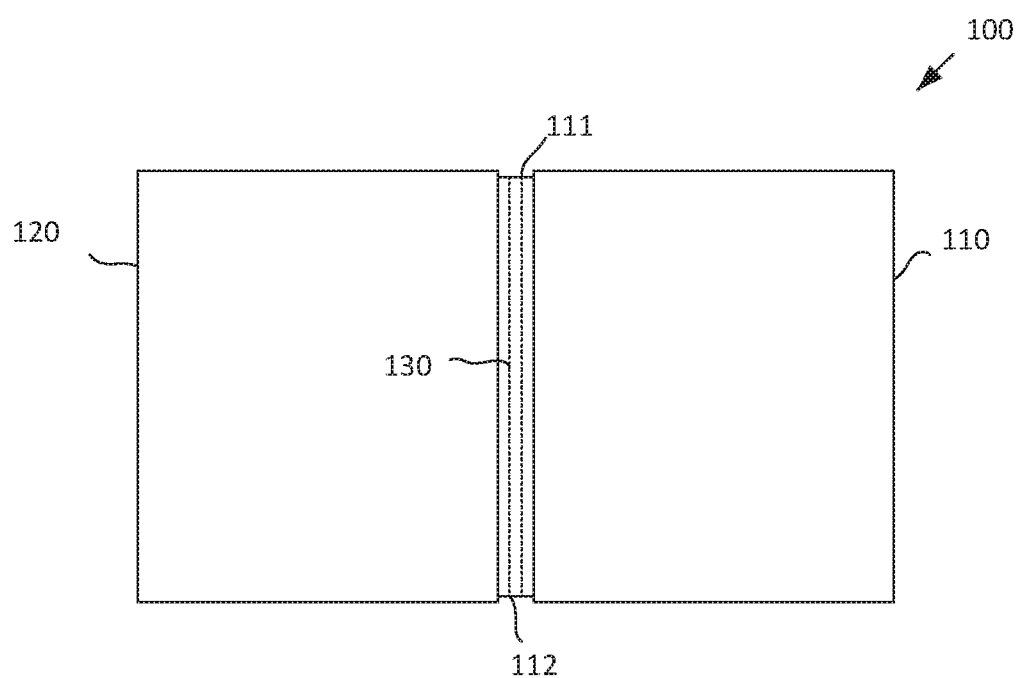
FIGS. 1A through 1D are schematic diagrams of an embodiment of a folio as described herein.
Figure 1B:
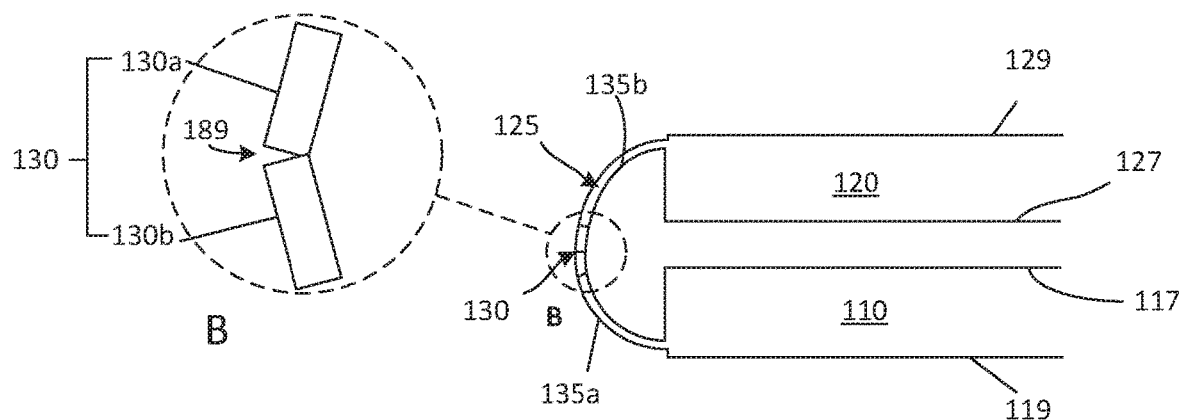
Figure 1C:
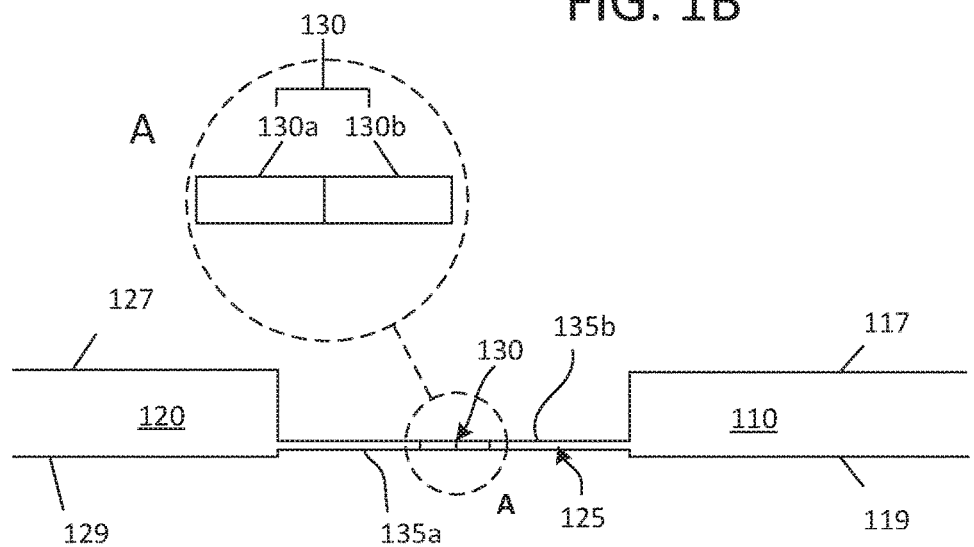
Figure 1D:
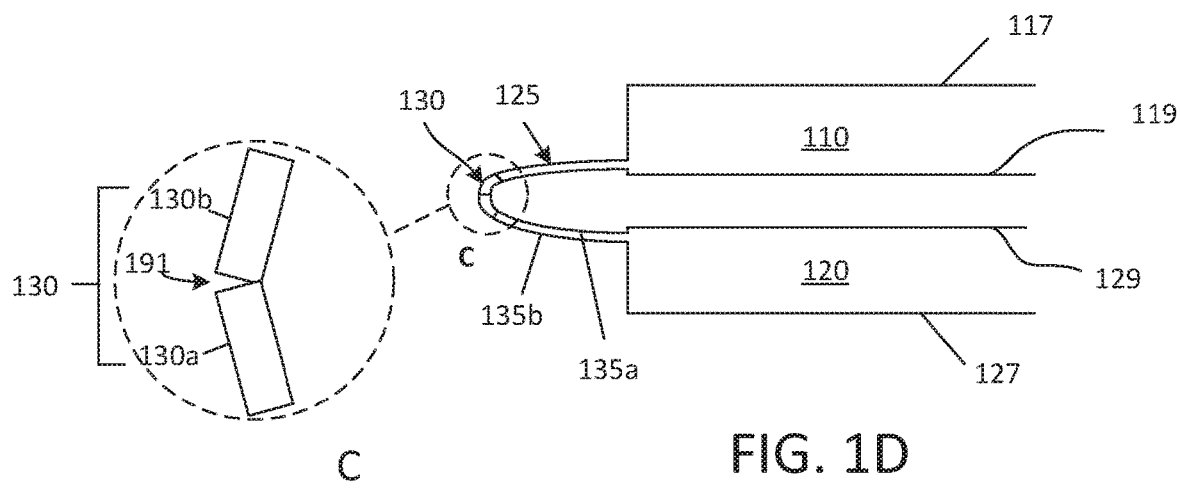

FIGS. 1A through 1D are schematic diagrams of an embodiment of a folio 100. FIG. 1B illustrates a closed configuration (or closed mode) of the folio 100, FIG. 1C illustrates an open configuration (or a laptop mode) of the folio 100, and FIG. 1D illustrates a tablet configuration (or tablet mode) of the folio 100. The folio 100 can be configured to be coupled to a computing device (e.g., a tablet, a mobile device, etc.).

As shown in FIGS. 1A through 1D, the folio 100 may include a base portion 110 and a covering portion 120. In some implementations, the base portion 110 may be hingedly coupled to the covering portion 120 via a flexible hinge portion 125. The base portion 110 may include a first surface portion 117 and a second surface portion 119, opposite the first surface portion 117. In one example implementation, the first surface portion 117 can be defined as a top surface and the second surface portion 119 can be defined as a bottom surface. The covering portion 120 may include a first surface portion 127 and a second surface portion 129, opposite the first surface portion 127. In one example implementation, the first surface portion 127 can be defined as a top surface and the second surface portion 129 can be defined as a bottom surface. In some implementations, the covering portion 120 may overlay or cover the base portion 110 in the closed configuration. In other words, the covering portion 120 may include a size and shape that is similar to a size and shape of the base portion 110.

In some implementations, when in the open configuration, as shown in FIG. 1C, the base portion 110 is not in contact with and/or is not aligned parallel to (e.g., is non-parallel to) the covering portion 120. More specifically, the first surface portion 117 (top surface) of the base portion 110 does not face and/or is not in contact with the first surface portion 127 (top surface) of the covering portion 120.

In some implementations, when in the closed configuration, as shown in FIG. 1B, the base portion 110 can be aligned parallel with respect to the covering portion 120. More specifically, the first surface portion 117 (top surface) of the base portion 110 faces and/or is in contact with the first surface portion 127 (top surface) of the covering portion 120.

In some implementations, when in the tablet configuration, as shown in FIG. 1D, the base portion 110 can be aligned parallel with respect to the covering portion 120. More specifically, the second surface portion 119 (bottom surface) of the base portion 110 faces and/or is in contact with the second surface portion 129 (bottom surface) of the covering portion 120. To describe this in a different manner, in comparison to the closed configuration of FIG. 1B, the tablet configuration is rotated in an opposite direction. For example, in the closed configuration, the covering portion 120 can rotate 180° in a first direction towards the first surface portion 117 (top surface) of the base portion 110, and in the tablet configuration, the covering portion 120 can rotate 180° in a second direction, opposite the first direction, towards the second surface portion 119 (bottom surface) of the base portion 110. Further, in use, in the tablet configuration, a user flips (e.g., rotates 180°) the folio 100 such that a computing device (not shown), which can be coupled to folio 100, is facing the user.

In some implementations, the flexible hinge portion 125 may include a magnetic element 130 configured to lock (e.g., engage) the folio 100 in place or in a more rigid position than within the magnetic element 130. More specifically, the magnetic element 130 can hold the folio 100 with sufficient stability that it prevents and/or reduces the computing device (not shown) from moving (e.g., rotating, flopping over) unexpectedly. In addition, use of the magnetic element 130 in the flexible hinge portion 125 avoids the use of mechanical fasteners for attaching the base portion 110 and the covering portion 120 together.

Referring back to FIG. 1A, the magnetic element 130 may extend between a first end portion 111 to a second end portion 112 of the flexible hinge portion 125. In some implementations, the magnetic element 130 may extend from the first end portion 111 to the second end portion 112 of the flexible hinge portion 125.

In some implementations, the magnetic element 130 can include several elements. For example, as shown in FIGS. 1B through 1D, there may be a first magnetic element 130*a* and a second magnetic element 130*b* disposed in the flexible hinge portion 125. Besides two magnetic elements 130*a*, 130*b*, example embodiments as described herein can also support having two or more magnetic elements.

Each of the magnetic elements 130*a*, 130*b* provides a magnetic attractive force that causes the magnetic elements 130*a*, 130*b* to attach to each other. In other words, each of the magnetic elements 130*a*, 130*b* can include an attachment feature to provide certain magnetic properties to support the folio 100 from rotating or flopping over in an undesirable fashion. For example, referring to FIG. 1C, when the folio 100 is in the open configuration, a portion of the first magnetic element 130*a* can be attached (e.g., engaged) to a portion of the second magnetic element 130*b*, as shown in enlarged circle A. In other words, the portion of the first magnetic element 130*a* can be cooperatively engaged to the portion of the second magnetic element 130*b* based upon the magnetic properties, which results in the magnetic elements 130*a*, 130*b* attaching to each other in a desired and repeatable manner. Due at least in part to the cooperative nature of the interaction of the magnetic fields, the magnetic elements 130*a*, 130*b* can attach to each other in a pre-determined position and relative orientation without external intervention. In some implementations, the pre-determined position of the magnetic elements 130*a*, 130*b* can be in a linear configuration (e.g., along a same planar surface). Although not shown in FIG. 1C, the folio 100 (and associated computing device (e.g., tablet)) can be in a laptop configuration when the magnetic elements 130*a*, 130*b* are engaged as shown in FIG. 1C.

In some implementations, the magnetic elements 130*a*, 130*b* can remain in the magnetically attached state until a releasing force of sufficient magnitude is applied that overcomes an overall net attractive magnetic force. For example, referring to FIG. 1B, when the folio 100 is in (e.g., is moved to) the closed configuration, the same portion of the first magnetic element 130*a* can be separated (e.g., detached) to the same portion of the second magnetic element 130*b*, as shown in enlarged circle B. In other words, the same portion of the first magnetic element 130*a* can be disengaged to the same portion of the second magnetic element 130*b* forming a gap 189 (e.g., space, distance, etc.) (shown in enlarged circle B) therebetween. In this configuration, the magnetic interaction between the magnetic elements 130*a*, 130*b* can be reduced. In other words, the magnetic force between the first magnetic element 130*a* and the second magnetic element 130*b* in the closed configuration of FIG. 1B is weaker as compared to the magnetic force between the first magnetic element 130*a* and the second magnetic element 130*b* when the folio 100 is in the open configuration of FIG. 1C.

In other implementations, referring to FIG. 1D, when the folio 100 is in (e.g., moved to) the tablet configuration, the same portion of the first magnetic element 130a can be separated (e.g., detached) to the same portion of the second magnetic element 130b, as shown in enlarged circle C. Hence, the same portion of the first magnetic element 130a can be disengaged to the same portion of the second magnetic element 130b forming a gap 191. In this case, when comparing the configuration of FIG. 1B, the magnetic elements 130a, 130b are in an opposite configuration. More specifically, the second magnetic element 130b is on top (rather than the bottom) and the first magnetic element 130a is on bottom (rather than the top). This is due to the covering portion 120 being rotated towards the second surface portion 119 (bottom surface) of the base portion 110.

In some implementations, the flexible hinge portion 125 can include a first fabric layer 135a and a second fabric layer 135b. In some implementations, the first fabric layer 135a can face the second fabric layer 135b. In other words, the second fabric layer 135b can be disposed on the first fabric layer 135a, as shown in FIG. 1C. The first fabric layer 135a and the second fabric layer 135b can be composed of a material that can be bent (e.g., wrinkled, curved, twisted, etc.) to provide necessary flexibility to open and close the folio 100. In some implementations, the first fabric layer 135a and/or the second fabric layer 135b may be composed from various materials, such as, for example, silicone, rubber, polyurethane, thermoplastic polyurethane ("TPU") and/or various other materials. In some implementations, the first fabric layer 135a and/or the second fabric layer 135b can be made from the same material as a material of the covering portion 120.

In some implementations, the magnetic element 130 (e.g., the first magnetic element 130a and the second magnetic element 130b) can be fixedly coupled to the first fabric layer 135a and/or the second fabric layer 135b. In some implementations, a portion (e.g., a lower portion) of the magnetic element 130 can be fixedly coupled to the first fabric layer 135a and/or the second fabric layer 135b. In other implementations, a portion (e.g., an upper portion) of the magnetic element 130 can be fixedly coupled to the first fabric layer 135a and/or the second fabric layer 135b. In some implementations, both portions (e.g., the upper and lower portions) of the magnetic elements 130 can be fixedly coupled to the first fabric layer 135a and/or the second fabric layer 135b.

In some implementations, the magnetic elements 130 can be rigid as compared to the flexible hinge portion 125 to which the magnetic elements 130 are attached in the flexible hinge portion 125. In other words, the magnetic elements 130 can be affixed (e.g., attached) to the flexible hinge portion 125 while the flexible hinge portion 125 bends.

In some implementations, the magnetic element 130 can be fixedly coupled to the first fabric layer 135a and/or the second fabric layer 135b via an adhesive or glue, for example. Other fastening means may be employed to attach the magnetic element 130 to the first fabric layer 135a and/or the second fabric layer 135b, such as, for example, sewn into the first fabric layer 135a and/or the second fabric layer 135b.

Because the magnetic element 130 is fixedly coupled to the first fabric layer 135a and/or the second fabric layer 135b of the flexible hinge portion 125, the magnetic element 130 may move in accordance to how the flexible hinge portion 125 is rotated. For example, when the folio 100 is in the closed configuration (or the tablet configuration), the flexible hinge portion 125 folds (e.g., bends, curves, twists), which causes the first magnetic element 130a and the second magnetic element 130b to separate (e.g., disengage, detach, disconnect) from the first fabric layer 135a and/or the second fabric layer 135b, due to the first magnetic element 130a and the second magnetic element 130b being attached at a bend portion of the flexible hinge portion 125. In other words, the first fabric layer 135a and the second fabric layer 135b should be composed of a material that can be bent to provide necessary flexibility to allow for the magnetic element 130 (and components thereof) to change between an engaged configuration and disengaged configuration.

In some implementations, the covering portion 120 can include a rigid material. The rigid material can employ, in some implementations, properties to maintain a flat configuration, and/or provide structural support of the covering portion 120. In one example implementation, the rigid material may be composed from a glass fiber material, for example. Other materials may be used, such as, for example, polypropylene plastic, corrugated polymeric material, compressed wood fiber, or metal sheet. In some implementations, the rigid material may be covered with a fabric layer (not shown) for added protection and/or appearance.

Other layers may be included to form the covering portion 120, such as, for example, a support layer and/or a resilient layer (not shown). The support layer may add strength and stronger construction of the covering portion 120. The resilient layer may absorb energy if the folio 100 is dropped onto a hard surface. In addition, the support layer and/or the resilient layer can protect components inside of the covering portion 120 from damage due to drops, impacts, vibrations and/or compression loads.

Figure 2A:
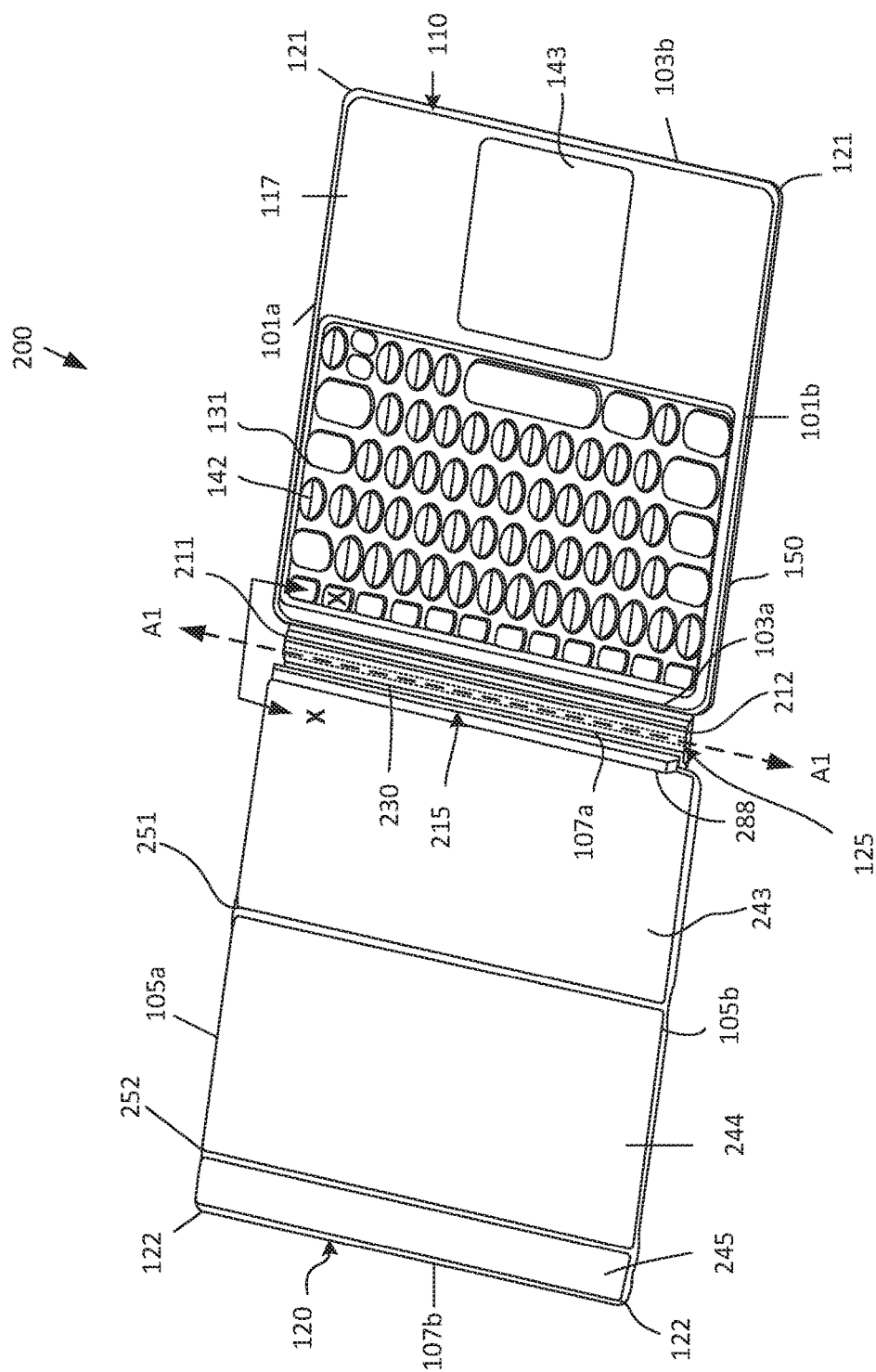
FIGS. 2A through 2G are diagrams that illustrate an example of the folio shown in FIGS. 1A through 1D.
Figure 2B:
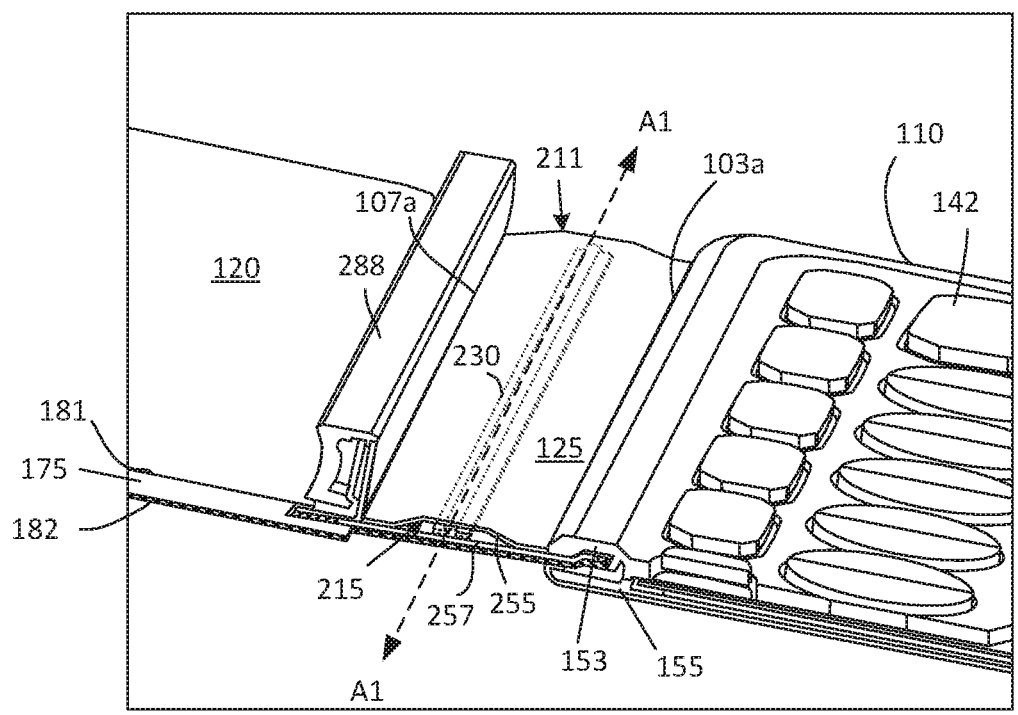
Figure 2C:
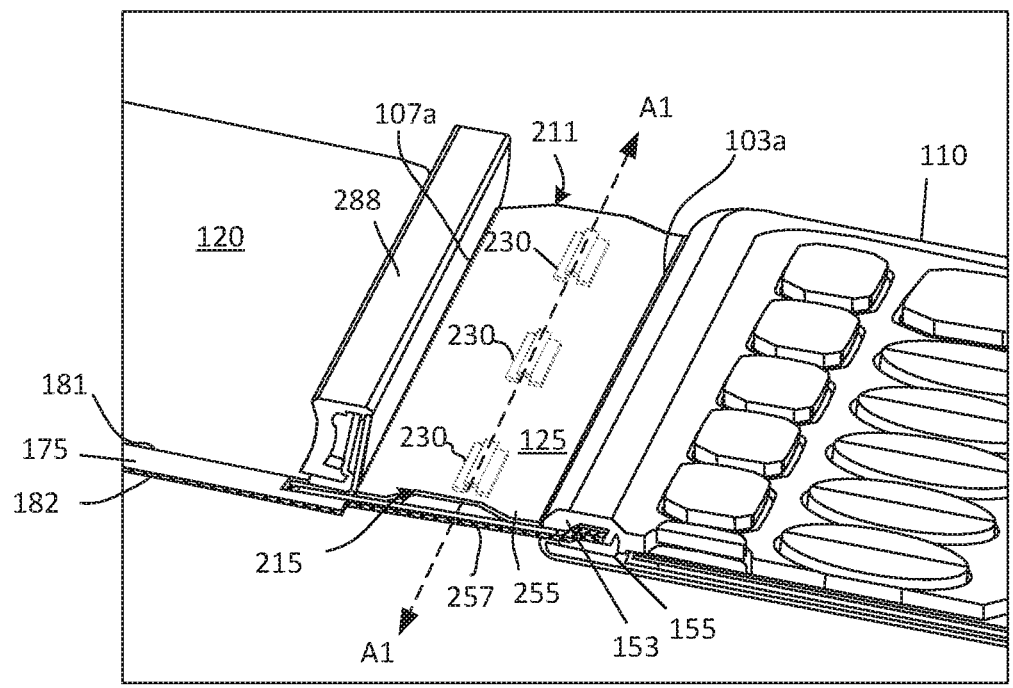
Figure 2D:
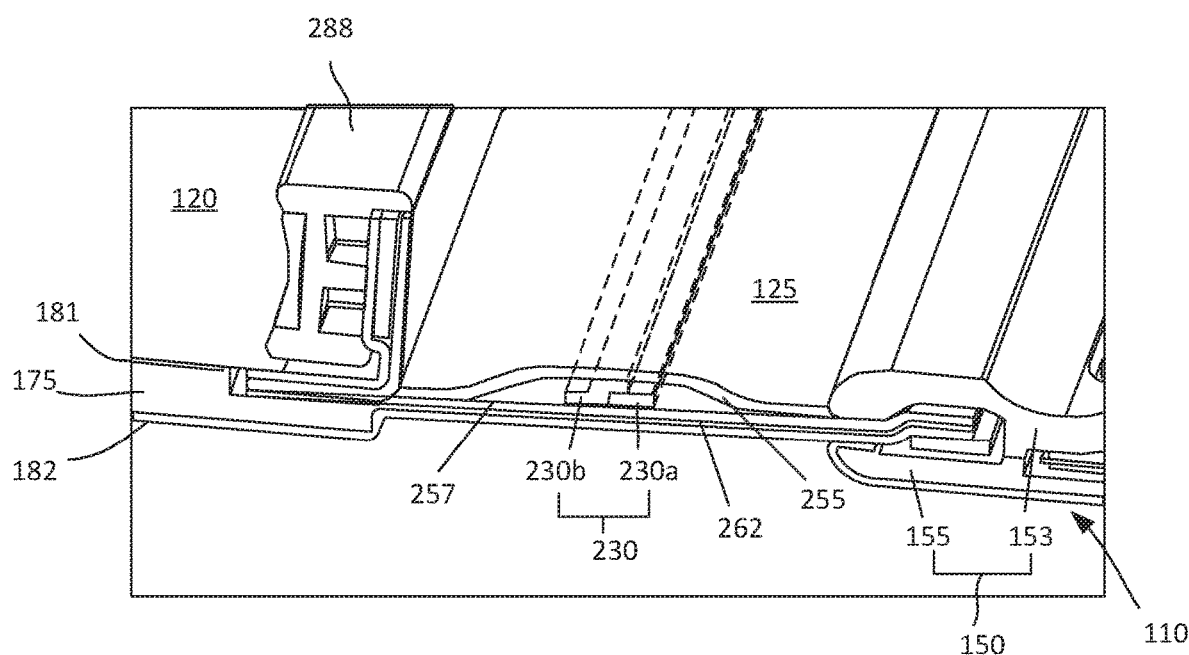
Figure 2E:
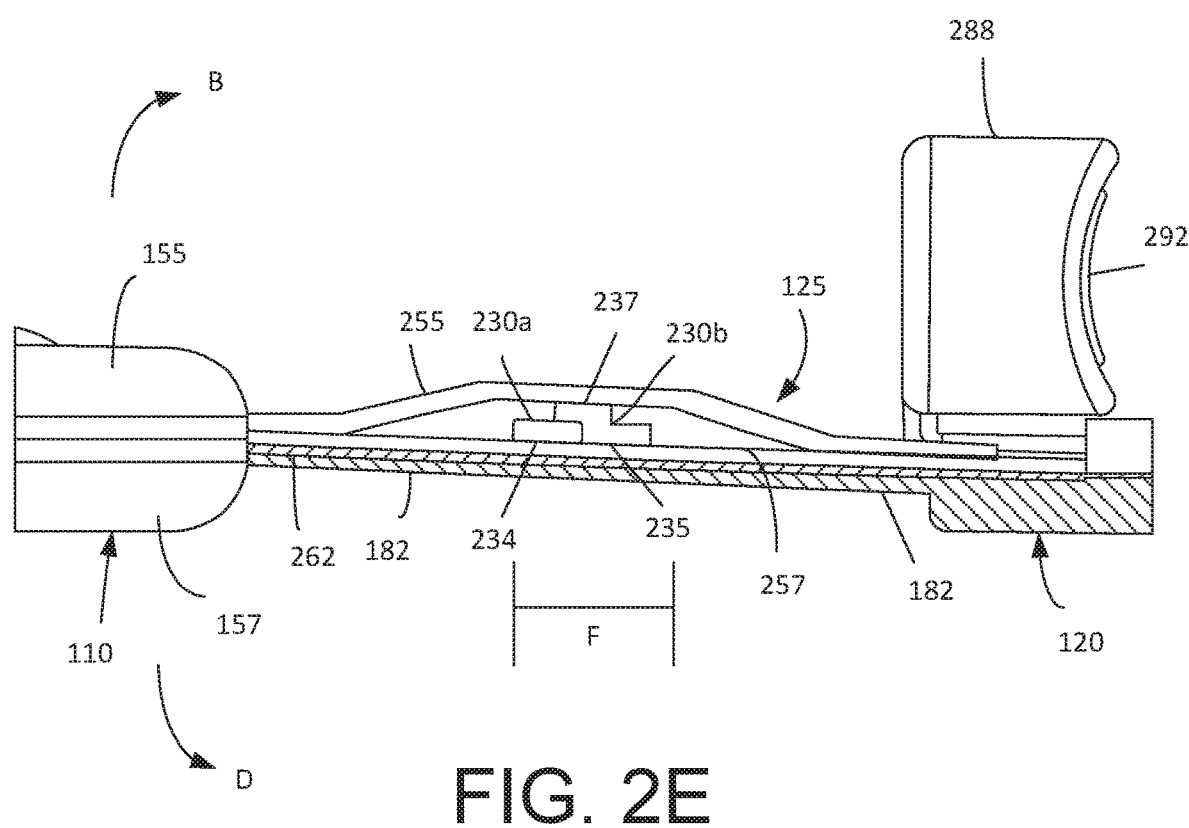
Figure 2F:
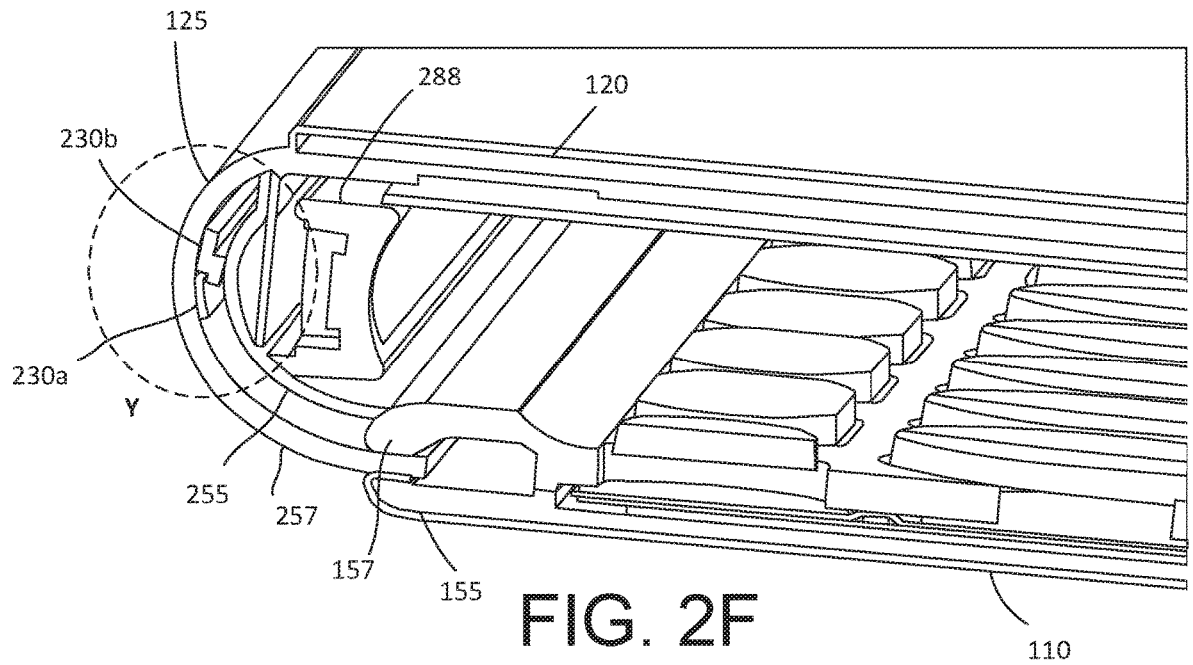
Figure 2G:
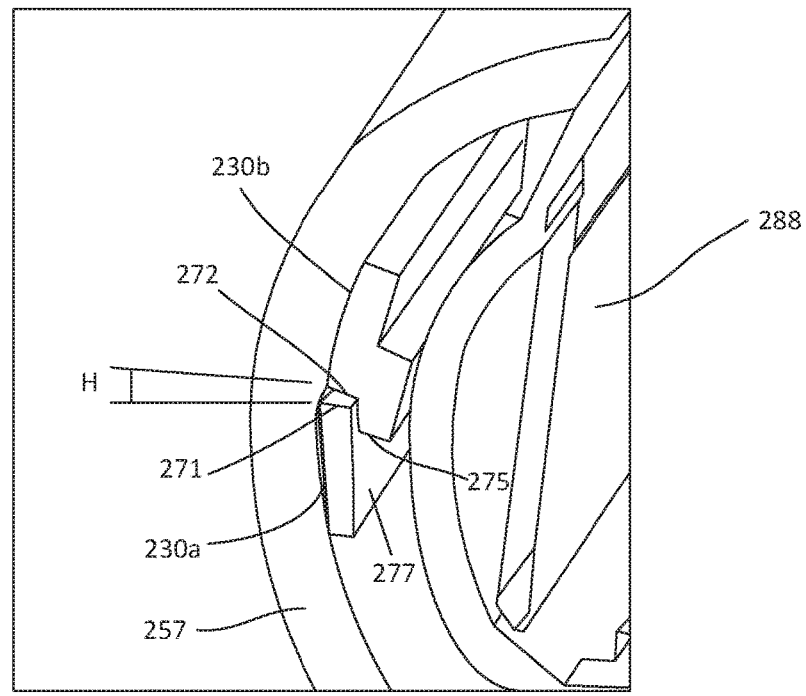

FIGS. 2A through 2G illustrate a folio 200 according to example implementations. The folio 200 shown in FIGS. 2A-2G is a variation of the folio 100 shown in FIGS. 1A through 1D. Like elements will use similar reference numbers. FIG. 2A is a perspective view of the folio 200 in an open configuration; FIGS. 2B-2D are partial perspective views of the folio 200 in the open configuration (or the laptop configuration); FIG. 2E is a side view, when viewed from a right side of the folio 200; and FIGS. 2F and 2G are perspective views of the folio 200 in a closed configuration.

Referring to FIG. 2A, the folio 200 includes a base portion 110 that is in an open position with respect to the covering portion 120 according to an example implementation. In some implementations, the base portion 110 may be generally rectangular shaped having two long sides (e.g., a right side end portion 101a and a left side end portion 101b) and two short sides (e.g., a proximal side end portion 103a and a distal side end portion 103b). The base portion 110 can be other shapes, such as, for example, a square. Further, corners 121 of the base portion 110 can be curved (e.g., rounded, smooth, etc.) so as to protect the base portion 110 from damage due to impact when compared to a sharp edge corner. Further, the curved corners 121 can provide an aesthetically pleasing look and/or feel to the folio 200.

In some implementations, the covering portion 120 may be generally rectangular shaped having two long sides (e.g., a right side portion 105a and a left side portion 105b) and two short sides (e.g., a proximal side portion 107a and a distal side portion 107b). The covering portion 120 can be other shapes, such as, for example, a square. Further, corners 122 of the covering portion 120 can also be curved (e.g., rounded, smooth, etc.) so as to protect the covering portion 120 from damage due to impact when compared to a sharp edge corner.

In some implementations, a shape of the covering portion 120 may correspond (e.g., substantially match) to a shape of the base portion 110. As a result, edges of the covering portion 120 are in-line (e.g., flush, even) with edges of the base portion 110. In some implementations, the edges of the base portion 110 and/or covering portion 120 can have a chamfered or beveled edge.

Figure 4:
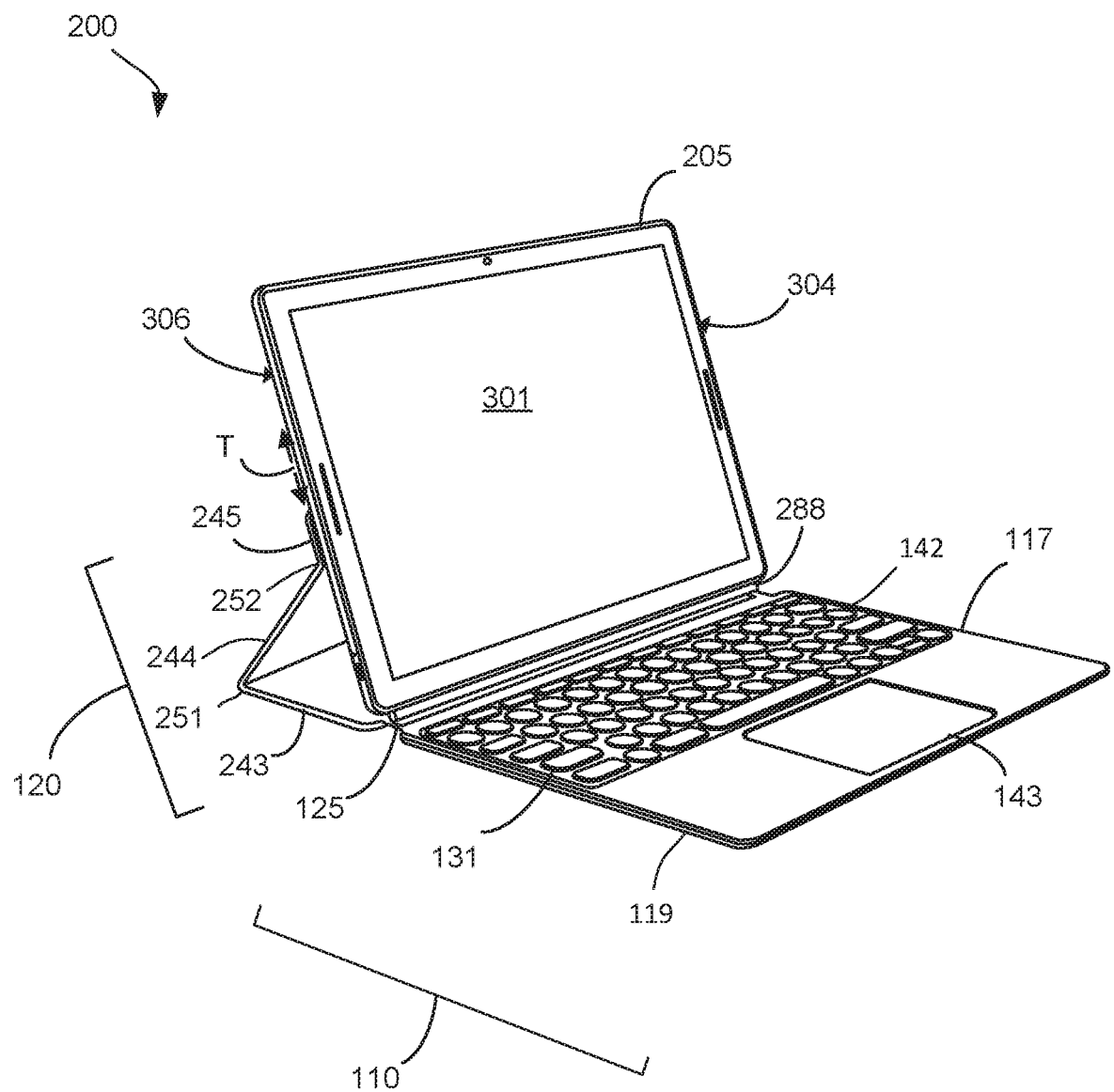
FIG. 4 is a schematic diagram of an example system that includes a computing device and an example of a folio.

In some implementations, the covering portion 120 can be coupled to a computing device 205 (as shown in FIG. 4). The computing device 205 may include a tablet computer. The computing device 205 may also include a laptop computer, a notebook computer or other type of computing device, such as, for example, a cellular phone, a media player, mobile device, or other handheld or portable electronic devices. Other configurations may be used for the computing device 205 if desired. The example of FIG. 4 is merely illustrative.

Referring to FIG. 2A, the covering portion 120 may be rotatably attached to the base portion 110 via the flexible hinge portion 125. The rotatable attachment of the covering portion 120 to the base portion 110, and/or the base portion 110 to the covering portion 120, may enable the covering portion 120 to rotate to the open position, in which the covering portion 120 is not in contact with the base portion 110, and/or in which the covering portion 120 is rotated at an angle away from the base portion 110. In some implementations, the covering portion 120 can rotate 180° (e.g., approximately 180°) in a first direction away from the base portion 110 or can rotate 180° (e.g., approximately) 180° in a second direction, opposite the first direction, towards the base portion 110. In other implementations, the covering portion 120 can rotate approximately 360° (e.g., approximately 360°) towards the rear surface portion 119 of the base portion 110. This configuration can be defined as a tablet mode.

In some implementations, the base portion 110 may include an input device 131. For example, the input device 131 may include at least a keyboard 142 and a touch-sensitive input device 143 (e.g., touch pad). In the opened configuration, the rotated cover portion 120 exposes the keyboard 142 and/or the touch-sensitive input device 143 disposed on the first surface portion 117 of the base portion 110.

The touch-sensitive input device 143 may be used to track movements of the user's finger on a surface of the touch-sensitive input device 143 by detecting the position (e.g., (x,y) coordinates) of the user's finger on the surface of the touch-sensitive input device 143 as the user's finger moves across the surface of the touch-sensitive input device 143. The computing device 205 (as shown in FIG. 4) may implement gesture recognition software that translates the detected positions of the user's finger into a gesture (e.g., pointer movement, scroll, etc.).

In some implementations, the base portion 110 may include a housing 150 (e.g., enclosure, casing, etc.) to house various structures and electronic components (not shown) inside of the base portion 110. For example, the housing 150 may enclose an integrated circuit chip, a printed circuit board (PCB), a micro-processor, a memory, cables, connectors, etc. In some implementations, the housing 150 may be formed as a unitary structure. In other words, the housing 150 may be a one-piece structure. In some implementations, the housing 150 can be formed of non-magnetic material, such as, a plastic material or various composite polymers, for protecting the subsystem and components disposed within the housing 150. In some implementations, the housing 150 can be formed from non-ferrous metals, such as, aluminum or non-magnetic stainless steel, for example.

In some implementations, as shown in FIG. 2D, the housing 150 may be formed as separate structures. In this regard, the housing 150 may include a first housing portion 153 and a second housing portion 155 forming an enclosure. In an example implementation, the first housing portion 153 may be defined as a top housing and the second housing portion 155 may be defined as a bottom housing.

In some implementations, the first housing portion 153 and the second housing portion 155 can be molded and/or otherwise formed from a polymeric material, for example. In some implementations, the first housing portion 153 and the second housing portion 155 can be joined together by a snap-fit, press-fit, fasteners and/or any other suitable attachment method. For example, the first housing portion 153 and the second housing portion 155 can be attached via fastening means (e.g., screws) inserted into corresponding screw bosses (not shown).

In some implementations, as shown in FIG. 2D, the covering portion 120 may be comprised of structural components having combinations of layers. For example, the covering portion 120 may include a rigid layer 175, a first fabric layer 181, and a second fabric layer 182. In this example implementation, the first fabric layer 181 may be defined as a top surface layer and the second fabric layer 182 may be defined as a bottom surface layer. The rigid layer 175 can be provided between the first fabric layer 181 and the second fabric layer 182. The rigid layer 175 can be made from a material that maintains the flat configuration and/or provide structural support. In one example implementation, the rigid layer 175 may be made from a glass fiber material, for example.

In some implementations, the first fabric layer 181 and/or the second fabric layer 182 may be composed from various materials, such as, for example, silicone, rubber, real or fake leather, polyurethane, thermoplastic polyurethane (a type of plastic typically referred to by its acronym, "TPU") and various other configurations. In some implementations, the first fabric layer 181 and/or the second fabric layer 182 may further include abrasion-resistance properties. In this regard, the first fabric layer 181 and/or the second fabric layer 182 may include a relatively high coefficient of friction (e.g., anti-slipping surface), which may limit or prevent movement of the folio 200 against a surface. In some implementations, the first fabric layer 181 and/or the second fabric layer 182 may include a micro-fiber to prevent and/or reduce damage to a display (not shown) of a computing device. In some implementations, each of the fabric layers 181 and 182 may be made from the same material. In other implementations, the first fabric layer 181 may be made from a different material with respect to the second fabric layer 182.

Other layers may be included to form the covering portion 120, such as, for example, a support layer and/or a resilient layer (not shown). The support layer may add strength and stronger construction of the covering portion 120. The resilient layer may absorb energy if the folio 200 is dropped onto a hard surface. In addition, the support layer and/or the resilient layer can protect components inside of the covering portion 120 from damages due to drops, impacts, vibrations and/or compression loads.

In some implementations, the base portion 110 may include a support layer and/or a resilient layer to protect components inside of the base portion 110 from damage due to drops, impacts, vibrations and/or compression loads.

In some implementations, the covering portion 120 may be formed with multiple segments that may be foldable by way of fold regions formed between the segments. For example, referring to FIG. 2A, the covering portion 120 may include a first segment 243, a second segment 244, and a third segment 245. Each of the first segment 243, the second segment 244, and the third segment 245 may be foldable or rotatable with respect to the remaining segments by way of fold regions 251, 252 between adjacent segments 243, 244, 245. In this example configuration, the fold region 251 can be disposed between the first segment 243 and the second segment 244, and the fold region 252 can be disposed between the second segment 244 and the third segment 245. In some implementations, the covering portion 120 may be folded into several distinct folded configurations. For example, the segments 243, 244, 245 can be rotated or folded to arrange the covering portion 120 in an open mode, a closed mode, a laptop mode, a tablet mode, etc.

In some implementations, the covering portion 120 may include an attachment element (not shown) which may be configured to attach the respective segments 243, 244, 245 to each other. In this regard, the attachment element may include, for example, magnetic element(s) to attach the segments 243, 244, 245 in various folded configurations. In some implementations, the attachment element may be embedded in each of the first segment 243, the second segment 244, and the third segment 245. In other implementations, the attachment element may be mechanical fasteners, such as, for example, clips, hook-and-look fasteners, screws, clamps, or pins, and/or adhesive, tape, or glue.

FIGS. 2B and 2C are schematic diagrams of a portion (including a cross-sectional view) of the exemplary folio 200. In these figures, close-up views of the flexible hinge portion 125 of the folio 200 are shown.

Referring to FIG. 2B, the flexible hinge portion 125 may include a magnetic element 230 to lock the folio 200 in place (e.g., in a laptop configuration). Alternatively, the magnetic element 230 may also have a similar configuration in an open configuration. More specifically, the magnetic element 230 in the open configuration and in the laptop configuration will be the same because the covering portion 120 (e.g., the first segment 244) in the open configuration and in the laptop configuration has the same position with respect to the base portion 110. The magnetic element 230 in the laptop mode holds the folio 200 with sufficient stability that it prevents and/or reduces the computing device 205 (as shown in FIG. 4) from rotating or flopping over in an undesirable fashion.

In some implementations, as shown in FIG. 2A, the magnetic element 230 may extend from a first end portion 211 to a second end portion 212 of the flexible hinge portion 125. To describe this in another manner, the magnetic element 230 may extend in a direction along longitudinal line A1-A1. For clarity sake, FIG. 2B is only a partial view of the folio 200 of FIG. 2A, and thus, illustrates the magnetic element 230 extending from the first end portion 211 to a portion 215 (e.g., middle portion) of the flexible hinge portion 125 along the longitudinal line A1-A1. The middle portion 215 can be an area of the flexible hinge portion 125 that is between the first end portion 211 and the second end portion 212.

In some implementations, as shown in FIG. 2C, the magnetic element 230 can be made up of several parts that extend along the longitudinal line A1-A1. In other words, the magnetic element 230 can be made up of several members instead of a continuous one-piece member, as shown in FIG. 2B. In this regard, an arrangement of a plurality of magnetic elements 230 can be disposed in the flexible hinge portion 125 in a serial configuration (e.g., a regular succession along a line). In other words, the plurality of magnetic elements 230 can be arranged one after the other, in a row, consecutively, from the first end portion 211 to the second end portion 212 along the longitudinal line A1-A1.

In some implementations, the magnetic element 230 can be made up of a first magnetic element 230a and a second magnetic element 230b disposed in the flexible hinge portion 125. The first magnetic element 230a and the second magnetic element 230b can provide magnetic attractive forces that cause the first magnetic element 230a and the second magnetic element 230b to attach to each other. In other words, each of the first magnetic element 230a and the second magnetic element 230b can include an attachment feature to provide certain magnetic properties to support the folio 200 from rotating or flopping over unexpectedly. For example, when the folio 200 is in the open configuration (or the laptop configuration), the first magnetic element 230a and the second magnetic element 230b can cooperatively engage (e.g., interlock) based upon the magnetic properties, which results in a portion of the first magnetic element 230a and a portion of the second magnetic element 230b attaching to each other in a desired and repeatable manner. Due at least in part to the cooperative nature of the interaction of the magnetic fields, the portion of the first magnetic element 230a and portion of the second magnetic element 230b can attach to each other in a pre-determined position and relative orientation without external intervention. In some implementations, the cooperative magnetic interaction can result in the portion of the first magnetic element 230a and the portion of the second magnetic element 230b to self-align and self-center in a desired orientation.

In some implementations, the first magnetic element 230a and the second magnetic element 230b can remain in the magnetically attached state until a releasing force of sufficient magnitude is applied that overcomes the overall net attractive magnetic force. For example, when the folio 200 is in the closed configuration (or the tablet configuration), the same portions of the attached magnetic elements 230a, 230b can separate (e.g., disengage, detach) such that the magnetic interaction between the magnetic elements 230a, 230b can be reduced. In other words, the magnetic force between the same portion of the first magnetic element 230a and the same portion of the second magnetic element 230b in the closed configuration is weaker as compared to the magnetic elements 230a, 230b in the open configuration (or laptop configuration). In other implementations, when the folio 200 is in the closed configuration, the magnetic interaction between the same portion of the first magnetic element 230a and the same portion of the second magnetic element 230b can be non-existent or relatively weak. In other words, there is no magnetic interaction present between the same portion of the first magnetic element 230a and the same portion of the second magnetic element 230b. In this case, the first magnetic element 230a and the second magnetic element 230b can be completely detached (e.g., no portions of the magnetic elements 230a, 230b contacting each other).

In some implementations, the first magnetic element 230a and the second magnetic element 230b can have a shape and/or form that can interlock to each other. The term "interlock" herein describes the first magnetic element 230a and the second magnetic element 230b having a characteristic to join (e.g., interconnect, link, etc.) to each other. In other words, the portion of the first magnetic element 230a being in an attached state to the portion of the second magnetic element 230b. Further, due to the particular shape of the first magnetic element 230a and/or the second magnetic element 230b, there may be more surface area that cooperatively engage (e.g., contact) between the magnetic elements 230a, 230b. This can cause the magnetic interaction (e.g., net attractive magnetic force) between the first magnetic element 230a and the second magnetic element 230b to be stronger.

In some implementations, at least one surface of the first magnetic element 230a and/or the second magnetic element 230b can be a straight planar surface. In other words, the surface can be flat. A flat planar surface can create a magnetic attractive force that is greater than a non-planar surface (e.g., curve). In some implementations, all of the surfaces of the first magnetic element 230a and/or the second magnetic element 230b can have straight planar surfaces (e.g., flat).

Referring to FIGS. 2D and 2E, a shape of the first magnetic element 230a and/or the second magnetic element 230b can be planar (e.g., lying in one plane; flat) or non-planar (e.g., lying in more than one plane). In one example implementation, the first magnetic element 230a can be planar and the second magnetic element 230b can be non-planar. In other words, the first magnetic element 230a has a generally rectangular shape and the second magnetic element 230b has a generally S-like shape, when viewing at a side view. To describe this in another manner, the second magnetic element 230b can partially lay over (e.g., surround) the first magnetic element 230a. Due to the particular shapes of the magnetic elements 230a, 230b, as illustrated herein, this provides a device having an interlocking structure.

Figure 3A:
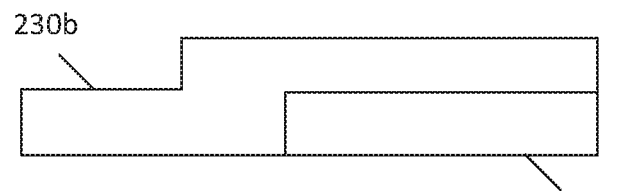
FIGS. 3A through 3E are diagrams that illustrate examples of an arrangement of a first magnetic element and a second magnetic element.
Figure 3B:
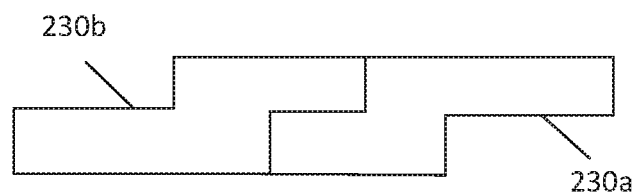
Figure 3C:
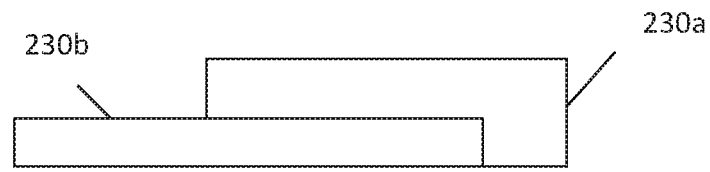
Figure 3D:
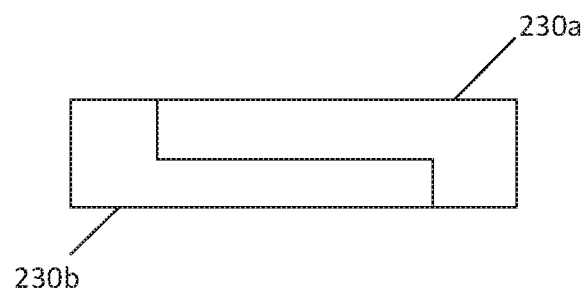
Figure 3E:
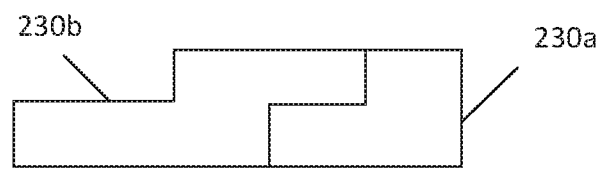

Referring to FIGS. 3A through 3E, the magnetic elements 230a, 230b can have other varying shapes (e.g., cross-sectional shapes) and sizes. In various implementations, as shown in FIGS. 3A through 3E, which are cross-sectional views when viewed from a side, the magnetic elements 230a, 230b may have other shapes and/or sizes, besides the one illustrated in FIG. 2D. For example, as described in example embodiments, FIG. 3A illustrates the first magnetic element 230a being substantially rectangular shaped and the second magnetic element 230b being substantially S-shaped. In comparison to the second magnetic element 230b as shown in FIG. 2D, the second magnetic element 230b of FIG. 3A can extend to an end portion of the first magnetic element 230a such that edges of the magnetic elements 230a, 230b match (e.g., flush). In another example, FIG. 3B illustrates the first magnetic element 230a being substantially S-shaped and the second magnetic element 230b being substantially S-shaped. In another example, as shown in FIG. 3C, the first magnetic element 230a being substantially L-shaped and the second magnetic element 230b being generally rectangular shaped. In another example, as shown in FIG. 3D, the first magnetic element 230a being substantially L-shaped and the second magnetic element 230b being substantially L-shaped. In this example, the two magnetic elements 230a, 230b are in an inverse mirror image (e.g., flipped reverse image). In another example, as shown in FIG. 3E, the first magnetic element 230a being substantially L-shaped (shortened) and the second magnetic element 230b being substantially S-shaped. The above described examples are merely general representations of shapes and sizes, and not limited to the ones described herein.

Referring back to FIG. 2D, the flexible hinge portion 125 may include a first fabric layer 255 and a second fabric layer 257. In one example implementation, the first fabric layer 255 can be defined as a top fabric layer and the second fabric layer 257 can be defined as a bottom fabric layer. Having two fabric layers 255, 257 may strengthen or reinforce (e.g., stiffen) the flexible hinge portion 125. The first and second fabric layers 255, 257 may be coupled to the base portion 110 and/or the covering portion 120. For example, one end of the first and second fabric layers 255, 257 can be attached to the base portion 110 and other end of the first and second fabric layers 255, 257 can be attached to the covering portion 120. In some implementations, as shown in FIG. 2D, the ends of the first and second fabric layers 255, 257 that are attached to the base portion 110 can be attached between the first housing 153 and the second housing 155 of the base portion 110.

In some implementations, the flexible hinge portion 125 can include more than two first and second fabric layers 255, 257. For example, a third fabric layer can be attached to the first fabric layer 255. In another example, a third fabric layer can be attached to the second fabric layer 257. In another example, a third fabric layer can be attached to the first fabric layer 255 and a fourth fabric layer can be attached to the second fabric layer 257.

In some implementations, the first and second fabric layers 255, 257 can be attached to the base portion 110 and/or the covering portion 120 using adhesive or glue, for example. Other fastening means may be used to attach the first and second fabric layers 255, 257 to the base portion 110 and/or the covering portion 120, such as, for example, welding, press fitting or friction fitting, etc. The attachment feature of the first and second fabric layers 255, 257 should be sufficient (strong enough) to bend the first and second fabric layers 255, 257 in both directions (e.g., away from the base portion 110 or towards the base portion 110) without detaching from the base portion 110 and/or the covering portion 120.

In some implementations, the first and second fabric layers 255, 257 may be composed from various materials, such as, for example, silicone, rubber, real or fake leather, polyurethane, thermoplastic polyurethane ("TPU") and various other configurations. In some implementations, each of the first and second fabric layers 255, 257 may be made from the same material. In other implementations, the first fabric layer 255 may be made from different material from the second fabric layer 257. In some implementations, at least one of the first and second fabric layers 255, 257 can be made from the same material as at least one of the fabric layers 181, 182 of the covering portion 120.

In some implementations, the second fabric layer 182 of the covering portion 120 can be made part of the flexible hinge portion 125. In other words, the second fabric layer 182 can be attached to the second fabric layer 257 in the flexible hinge portion 125. For example, the second fabric layer 182 can be attached to the second fabric layer 257 via an adhesive 262. The second fabric layer 182 can be used to protect the first and second fabric layers 255, 257 from damages (e.g., breakage, tears, slits, etc.). In some implementations, the second fabric layer 182 can be attached to the base portion 110. In this regard, an end portion of the fabric layer 182, along with the end portions of the first and second fabric layers 255, 257, can be attached to the base portion 110. In some implementations, the end portion of the fabric layer 182 can be disposed between the first housing member 155 and the second housing member 157 of the base portion 110.

Referring to FIG. 2E, which is a side view, taken along view X-X of FIG. 2A, the first and second magnetic elements 230a, 230b may be disposed between the first fabric layer 255 and the second fabric layer 257. In some implementations, the first and second magnetic elements 230a, 230b may be removably coupled to the first fabric layer 255 and/or the second fabric layer 257. For example, one or both of the first and second magnetic elements 230*a*, 230*b* may be removably coupled to the second fabric layer 257. More specifically, a portion 234 of the first magnetic element 230*a* and a portion 235 of the second magnetic element 230*b* can be removably coupled to second fabric layer 257. In other implementations, at least one of the first and second magnetic elements 230*a*, 230*b* may be removably coupled to the first fabric layer 255. For example, a portion 237 of the second magnetic element 230*b* can be removably coupled to the first fabric layer 255. In other implementations, at least one of the first and second magnetic elements 230*a*, 230*b* may be removably coupled to both of the first fabric layer 255 and second fabric layer 257. For example, the portion 235 of the second magnetic element 230*b* and the portion 237 of second magnetic element 230*b* can be removably coupled to the second fabric layer 257 and the first fabric layer 255, respectively. The above described examples are merely general representations of the various attachment features, and may further vary depending on the shapes and sizes of the magnetic elements.

In some implementations, the first and second magnetic elements 230*a*, 230*b* can be removably coupled to the first and second fabric layers 255, 257 in a region that is generally middle (or middle portion) of the flexible hinge portion 125. In other words, when viewing at a side view, as shown in FIG. 2E, the first and second magnetic elements 230*a*, 230*b* are removably attached to at least one of the first and second fabric layers 255, 257 approximately in a region F of the flexible hinge portion 125. To describe this in another manner, the region F may be defined as a bending portion of the flexible hinge portion 125. The bending movement of the flexible hinge portion 125 causes the first and second magnetic elements 230*a*, 230*b* to move with respect to each other, which will be described in detail later.

In some implementations, the first and second magnetic elements 230*a*, 230*b* can be attached to at least one of the first and second fabric layers 255 257 via an adhesive or glue, for example. Other fastening means may be employed to attach the first and second magnetic elements 230*a*, 230*b* to the first and second fabric layers 255, 257, such as, for example, sewn into the first and second fabric layers 255, 257.

FIGS. 2F and 2G are diagrams of the folio 200 in an example closed configuration. FIG. 2F is a side view of a portion of the flexible hinge portion 125 of FIG. 2A according to an example implementation. As shown in FIG. 2F, the covering portion 120 can be rotated (e.g., 180°) towards the base portion 110 (as shown by arrow B in FIG. 2E) so as to bend the flexible hinge portion 125. In other words, the covering portion 120 can be rotated such that the covering portion 120 is aligned parallel with respect to the base portion 110, which illustrates a closed configuration.

Due to the first and second magnetic elements 230*a*, 230*b* being attached at the bending portion of the flexible hinge portion 125, this causes the first and second magnetic elements 230*a*, 230*b* to move (e.g., separate, detach) from each other. For example, as shown in FIG. 2G, an end portion 271 of the first magnetic element 230*a* can be separated (e.g., disengaged, detached) from an end portion 272 of the second magnetic element 230*b*.

Referring to FIG. 2G, which is an enlarged view of an area associated with portion Y shown in FIG. 2F, a distance H is formed between the separated magnetic elements 230*a*, 230*b*. Alternatively, the distance H can be defined as an opening, a gap, a space, etc.

Because of the contour (e.g., radius of curvature) of the flexible hinge portion 125 when the flexible hinge portion 125 is bent, the distance H may be larger than at other orientations of the folio 200 (e.g., laptop configuration or open configuration). For example, distance H may be at the largest distance when the folio 200 is in the closed configuration and becomes smaller as the folio 200 is converted into the laptop configuration or open configuration. In contrast, in the laptop configuration or open configuration, no distance H is provided between the first and second magnetic elements 230*a*, 230*b* due to the first and second magnetic elements 230*a*, 230*b* being interlocked and attached together. Further, in the closed configuration, the magnetic interaction between the first and second magnetic elements 230*a*, 230*b* can be reduced and/or non-existence. In some implementations, no magnetic interaction force can be present between the first and second magnetic elements 230*a*, 230*b* so that the covering portion 120 can remain closed with respect to the base portion 110.

In some implementations, when the folio 200 is in the open configuration (or the laptop configuration), the covering portion 120 can be rotated (e.g., 180°) in a direction away from the base portion 110. In other words, the covering portion 120 can be rotated such that the covering portion 120 may be straight or approximately straight (i.e., not bent, flexed, or rotated) with respect to the base portion 110. To describe this in another manner, the flexible hinge portion 120 may be flattened out (i.e., arranged such that the covering portion 120 and the base portion 110 may be oriented on or substantially on the same plane). In this example implementation, a portion of the first magnetic element 230*a* and a portion of the second magnetic elements 230*b* can be attached together so that no distance H is provided between the portion of the first magnetic element 230*a* and the portion of the second magnetic elements 230*b*. In other words, the portion of the first magnetic element 230*a* can be attached and interlocked with the portion of the second magnetic elements 230*b*. For example, the end portion 271 of the first magnetic element 230*a* can be attached to the end portion 272 of the second magnetic element 230*b* when the respective portions are brought into proximity to each other. In this implementation, the magnetic force between the portion of the first magnetic element 230*a* and the portion of the second magnetic elements 230*b* is at their strongest, and can remain in the magnetically attached state until a releasing force of sufficient magnitude is applied that overcomes the overall net attractive magnetic force. In some implementations, the first and second magnetic elements 230*a*, 230*b* can be attached to each other in a pre-determined position and relative orientation without external intervention.

In some implementations, when the folio is in the tablet configuration (not shown), the covering portion 120 can be rotated (e.g., 180°) in a direction towards the base portion 110 (as shown by arrow D in FIG. 2E) so as to bend the flexible hinge portion 125. In other words, the covering portion 120 can be rotated such that the covering portion 120 is aligned parallel with respect to the rear surface 119 (as shown in FIG. 1D) of the base portion 110. In this example implementation, similar to the closed configuration, a portion of the first magnetic element 230*a* and a portion of the second magnetic elements 230*b* can move (e.g., separate, detach) from each other. For example, an end portion 275 of the second magnetic element 230*b* can be separated (e.g., disengaged, detached) from a surface portion 277 of the first magnetic element 230*a*. As a result, this creates a gap (e.g., an opening, a space) (not shown) between the first magnetic element 230*a* and the second magnetic element 230*b* when the folio 200 is in the tablet configuration. Due to the separation of the first and second magnetic elements 230a, 230b, the magnetic interaction between the first and second magnetic elements 230a, 230b can be reduced and/or non-existence.

FIG. 4 is a schematic diagram of the folio 200 in an exemplary laptop configuration. In this example implementation, the covering portion 120 may be folded into a distinct folded configuration so as to view the computing device 205 in a laptop mode. For example, the second segment 244 of the covering portion 120 can be rotated or folded in a first direction (e.g., towards the base portion 110) via the fold region 251 such that the second segment 244 of the covering portion 120 is at an angle 45° or approximately 45° with respect to the first segment 243 of the covering portion 120. The third segment 245 of the covering portion 120 can then be rotated or folded in a second direction, opposite the first direction (e.g., away from the base portion 110) via the fold region 252 such that the third segment 245 of the covering portion 120 is at an angle 20° or approximately 20° with respect to the second segment 244 of the covering portion 120. The rotation angles may vary depending on the user's preference and viewing angle.

In some implementations, the third segment 245 of the covering portion 120 may be configured to move (e.g., slide) along a portion of a rear surface 306 of the computing device 205. For example, the third segment 245 may slide along a translational axis in a translational direction (indicated by "T"). For purposes of this description, the sliding along the translational axis will be described from a point of view of view looking at a front surface 304 of the computing device 205 when the computing device 205 is in a landscape orientation (i.e., a larger dimension of a display 301 is oriented horizontally). Some implementations are possible in which the translational axis is different or the computing device 205 is oriented differently. The translational axis may for, example, be aligned with a vertical axis of the computing device 205 when the computing device 205 in in a landscape orientation. A first translational direction may be directed from a bottom side (i.e., the side below the display 301) of the computing device 205 to a top side (i.e., the side above the display 301) of the computing device 205, and a second translation direction may be directed in the opposite direction (i.e., from the top of the computing device 205 to the bottom).

In some implementations, the third segment 245 of the covering portion 120 may be magnetically coupled to at least a portion of the rear surface 306. In this regard, the third segment 245 of the covering portion 120 may include a magnetic material and the rear surface 306 may include one or more magnetically susceptible regions to attract the magnetic material of the third segment 245 of the covering portion 120. The magnetically susceptible regions of the rear surface 306 may be formed from magnetically susceptible materials. In some implementations, the magnetically susceptible regions of the rear surface 306 are not formed from magnetically susceptible materials but are instead in close proximity to magnetically susceptible materials. For example, the rear surface 306 may be formed from a magnetically inert material (e.g., a polymer or non-magnetic metal) but a magnetically susceptible material may be disposed inside the computing device 205 near or adjacent to the rear surface 306.

In some implementations, the magnetically susceptible region of the rear surface 306 may extend from a lower position on the rear surface 306 to a higher position on the rear surface 306. The third segment 245 of the covering portion 120 may then slide between a bottom and a top of the rear surface 306 and may be positioned at the bottom, the top, or anywhere in between. As the third segment 245 of the covering portion 120 moves in the translation direction T along the rear surface 306, the second segment 244 of the covering portion 120 will rotate with respect to the first segment 243 of the covering portion 120 as will the computing device 205. In this manner, a user can adjust the viewing angle of the display 301. For example, as the third segment 245 of the covering portion 120 moves down toward the bottom of the rear surface 306, the computing device 205 rotates to a more upright angle. Conversely, as the third segment 245 of the covering portion 120 moves up toward the top of the rear surface 306, the computing device 205 rotates to a more horizontal angle. Because the third segment 245 of the covering portion 120 can be adjusted to numerous positions within the magnetically susceptible region, the computing device 205 can be rotated to numerous angles. In other words, the folio 200 may allow for numerous adjustments to the angle of the computing device 205.

A magnetic material may be a material that produces a magnetic field. For example, a magnetic material may produce a magnetic field independent of any contemporaneous external magnetic field. In some implementations, an external magnetic field is applied during the formation of a magnetic material and then the magnetic field of the magnetic material persists after removal of the external magnetic material. Magnetic materials may produce magnetic fields having a field strength of at least 5 gausses. The magnetic moments of the electrons of a magnetic material may be substantially coordinated so that the magnetic moments point in the same direction.

A ferromagnetic material may be a material having a high susceptibility to magnetization. Some ferromagnetic materials may also be magnetic materials. For example, a ferromagnetic material may form a magnetic material or may be attracted to a magnetic material. Examples of ferromagnetic materials include, but are not limited to, iron, nickel, cobalt and most alloys of these metals. Other examples of ferromagnetic materials include rare earth magnets such as neodymium magnets and samarium-cobalt magnets.

A magnetically susceptible material is a material that is attracted to a magnetic material. Magnetically susceptible materials include magnetic materials and ferromagnetic materials.

In some implementations, the computing device 205 can be removably coupled to the covering portion 120 of the folio 200 via a docking member 288. The docking member 288 can include one or more electronic components through which the folio 200 can communicate with the computing device 205. The docking member 288 can be configured to be coupled to a portion (e.g., a port) of the computing device 205. The docking member 288 may include a circuit that is configured to communicate data, power, and/or so forth between the folio 200 and the computing device 205. In some implementations, the folio 200 can communicate a mode to the computing device 205 via the docking member 288. The mode can be communicated via, for example, a mode signal. For example, the mode signal can represent an open mode, a closed mode, a tablet mode, a laptop mode, and so forth. In some implementations, the mode signal can be produced by a processor disposed inside the base portion 110 and/or the computing device 205. In some implementations, the docking member 288 may transmit data representing, for example, keystrokes received via the input device(s) 131.

In some implementations, the docketing member 288 may include a protective layer 292. The protective layer 292 may protect the docketing member 288 when the computing device (not shown) is coupled to the docketing member 288. In some implementations, the protective layer 292 can be made from an elastomeric material, such as, for example, silicon rubber.

Example embodiments disclose a method of using the exemplary folios and systems described herein. The method can include rotating the covering portion about a flexible hinge portion in a first direction away from the base portion to an open configuration such that a portion of a first magnetic element is attached to a portion of a second magnetic element, the flexible hinge portion including the first magnetic element and the second magnetic element, and rotating the covering portion in about the flexible hinge portion in a second direction, opposite the first direction, towards the base portion to a closed configuration such that the portion of the first magnetic element is separated from the portion of the second magnetic element.

In some implementations, the method may include the first magnetic element and the second magnetic element can be at least partially attached in the flexible hinge portion. The first magnetic element and the second magnetic element can be rigid as compared to the flexible hinge portion to which the first magnetic element and the second magnetic element are attached in the flexible hinge portion.

Figure 5:
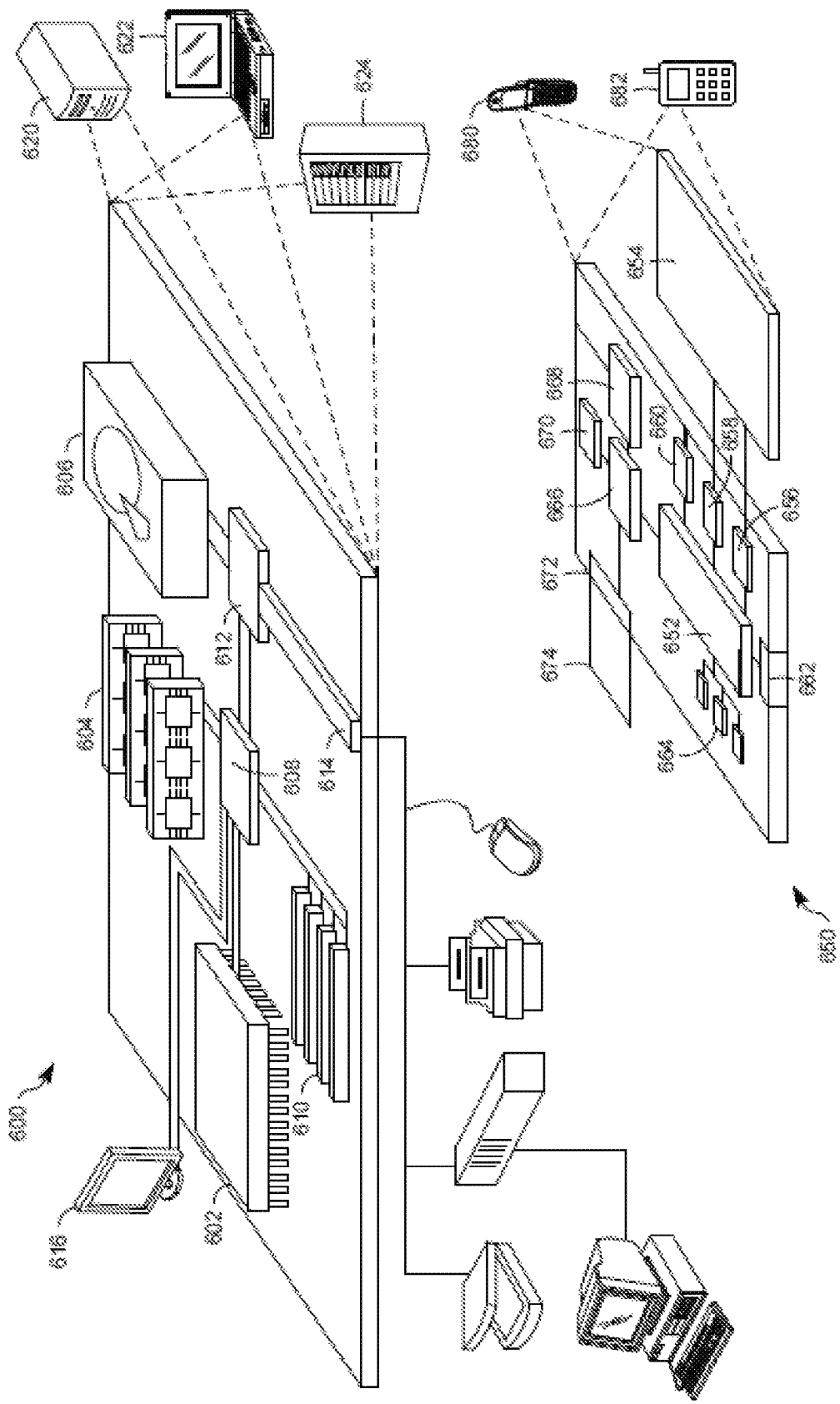
FIG. 5 illustrates an example of a computer device and a mobile computer device that can be used with circuits described here.

In some implementations, the method may include attaching at least one the first magnetic element or the second magnetic element to at least one of a first fabric layer or a second fabric layer. In some implementations, the first magnetic element and the second magnetic element may be disposed between the first fabric layer and the second fabric layer FIG. 5 shows an example of a generic computer device 600 and a generic mobile computer device 650, which may be used with the techniques described here. Features described with respect to the computer device 600 and/or mobile computer device 650 may be included in the portable computing device 100 described above. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

The computing device according to example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein may be interpreted accordingly.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A folio, comprising:
    a covering portion;
    a flexible hinge portion; and
    a first magnetic element and a second magnetic element, the first magnetic element and the second magnetic element being disposed in the flexible hinge portion, the first magnetic element being configured to move with respect to the second magnetic element,
    the folio configured to move between an open configuration and a closed configuration such that:
        when the folio is in the open configuration, a portion of the first magnetic element is attached to a portion of the second magnetic element,
        when the folio is in the closed configuration, the portion of the first magnetic element is separated from the portion of the second magnetic element.

2. The folio of claim 1, wherein the flexible hinge portion including a first end portion and a second end portion, a length of the first end portion and the second end portion defining a longitudinal line, the first magnetic element and the second magnetic element being disposed along the longitudinal line.

3. The folio of claim 2, wherein the first magnetic element and the second magnetic element are configured as a continuous one-piece member along the longitudinal line.

4. The folio of claim 1, further comprising a fabric layer disposed in the flexible hinge portion, the fabric layer includes a first fabric layer and a second fabric layer,
    wherein the first magnetic element and the second magnetic element are attached to at least one of the first fabric layer or the second fabric layer.

5. The folio of claim 4, wherein the first magnetic element and the second magnetic element are disposed between the first fabric layer and the second fabric layer.

6. The folio of claim 4, wherein the first magnetic element includes a first surface portion and a second surface portion opposite the first surface portion, the second magnetic element includes a first surface portion and a second surface portion opposite the first surface portion, the first surface portion of the first magnetic element being on the same side as the first surface portion of the second magnetic element, the first surface portion of the first magnetic element being attached to the first fabric layer, and the first surface portion of the second magnetic element being attached to the first fabric layer.

7. The folio of claim 6, wherein the second surface portion of the second magnetic element being attached to the second fabric layer.

8. The folio of claim 1, wherein at least one of the first magnetic element or the second magnetic element is substantially S-shaped, when viewed from a side view.

9. The folio of claim 1, wherein at least one of the first magnetic element or the second magnetic element is substantially L-shaped, when viewed from a side view.

10. A folio, comprising:
    a base portion;
    a covering portion;
    a flexible hinge portion rotatably coupled to at least one of the base portion or the covering portion; and
    a first magnetic element and a second magnetic element, the first magnetic element being configured to move with respect to the second magnetic element between an engaged configuration and a disengaged configuration based on the folio being in an open configuration or a closed configuration, wherein:
        when the folio is in the open configuration, a portion of the first magnetic element is engaged to a portion of the second magnetic element,
        when the folio is in the closed configuration, the portion of the first magnetic element is disengaged from the portion of the second magnetic element in the second position.

11. The folio of claim 10, wherein, in the closed configuration, a first distance is provided between the portion of the first magnetic element and the portion of the second magnetic element.

12. The folio of claim 11, wherein, in the open configuration, a second distance is provided between the portion of the first magnetic element and the portion of the second magnetic element.

13. The folio of claim 12, wherein the first distance is greater than the second distance.

14. The folio of claim 10, wherein a shape of the first magnetic element is planar and a shape of the second magnetic element is non-planar.

15. The folio of claim 14, wherein the second magnetic element is substantially L-shaped, when viewed from a side view.

16. The folio of claim 14, wherein the second magnetic element is substantially S-shaped, when viewed from a side view.

17. The folio of claim 10, wherein the first magnetic element and the second magnetic element are disposed in the flexible hinge portion.

18. The folio of claim 10, wherein the flexible hinge portion includes a first end portion and a second end portion, a length of the first end portion and the second end portion defining a longitudinal line, the first magnetic element and the second magnetic element being disposed along the longitudinal line.

19. A system, comprising:
    a computing device including a display; and
    a folio for the computing device, including:
        a base portion;
        a covering portion;
        a flexible hinge portion rotatably coupled to at least one of the base portion or the covering portion; and
        a first magnetic element and a second magnetic element, the first magnetic element and the second magnetic element being disposed in the flexible hinge portion, the first magnetic element being configured to move with respect to the second magnetic element, the folio configured to move between an open configuration and a closed configuration such that:

when the folio is in the open configuration, a portion of the first magnetic element is attached to a portion of the second magnetic element, when the folio is in the closed configuration, the portion of the first magnetic element is separated from the portion of the second magnetic element.

20. The system of claim 19, wherein the folio includes a connector member, the connector member configured to connect the computing device to the folio.

21. A method, comprising:

rotating the covering portion about a flexible hinge portion in a first direction away from the base portion to an open configuration such that a portion of a first magnetic element is attached to a portion of a second magnetic element, the flexible hinge portion including the first magnetic element and the second magnetic element; and rotating the covering portion in about the flexible hinge portion in a second direction, opposite the first direction, towards the base portion to a closed configuration such that the portion of the first magnetic element is separated from the portion of the second magnetic element.

22. The method of claim 21, wherein the flexible hinge portion includes a first fabric layer and a second fabric layer, wherein the first magnetic element and the second magnetic element are attached to at least one of the first fabric layer or the second fabric layer.

23. The method of claim 22, wherein the first magnetic element and the second magnetic element are disposed between the first fabric layer and the second fabric layer.

* * * * *